United States Patent
Hosur et al.

(10) Patent No.: US 7,724,832 B2
(45) Date of Patent: May 25, 2010

(54) MIMO DECODING

(75) Inventors: Srinath Hosur, Plano, TX (US);
Jaiganesh Balakrishnan, Dallas, TX (US); Michael Polley, Garland, TX (US); Manish Goel, Plano, TX (US); Muhammad Ikram, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1377 days.

(21) Appl. No.: 10/857,417

(22) Filed: May 27, 2004

(65) Prior Publication Data

US 2005/0265465 A1     Dec. 1, 2005

(51) Int. Cl.
*H04K 1/10* (2006.01)
(52) U.S. Cl. .................................... 375/260
(58) Field of Classification Search ............... 375/148, 375/260, 267, 340, 341, 347, 364
See application file for complete search history.

(56) References Cited

U.S. PATENT DOCUMENTS

| | | | | |
|---|---|---|---|---|
| 5,867,538 | A * | 2/1999 | Liu ............................ | 375/341 |
| 6,301,470 | B1 * | 10/2001 | Brunner et al. .......... | 455/278.1 |
| 6,904,109 | B1 * | 6/2005 | Hottinen .................... | 375/346 |
| 7,016,440 | B1 * | 3/2006 | Singer et al. ............... | 375/350 |
| 2002/0110206 | A1 * | 8/2002 | Becker et al. .............. | 375/346 |
| 2002/0159507 | A1 * | 10/2002 | Flaig et al. ................. | 375/148 |
| 2003/0048857 | A1 * | 3/2003 | Onggosanusi et al. ....... | 375/267 |
| 2003/0063654 | A1 * | 4/2003 | Onggosanusi et al. ....... | 375/130 |
| 2004/0228417 | A1 * | 11/2004 | Kennedy et al. ............ | 375/260 |

* cited by examiner

*Primary Examiner*—David C Payne
*Assistant Examiner*—Leon-Viet Q Nguyen
(74) *Attorney, Agent, or Firm*—Ronald O. Neerings; Wade James Brady, III; Frederick J. Telecky, Jr.

(57) ABSTRACT

In MIMO wireless communications employing LMMSE receiver, the symbols transmitted through a transmit antenna are estimated at the receiver in the presence of interference consisting of two main components: one due to the additive noise and the other due to (interfering) symbols transmitted via the remaining antennas. This has been shown to hamper the performance of a communication system resulting in incorrect symbol decisions, particularly at low SNR. IMMSE has been devised as a solution to cope with this problem; In IMMSE processing, the symbols sent via each transmit antenna are decoded iteratively. In each stage of processing, the received signal is updated by removing the contribution of symbols detected in the previous iterations. In principle, this reduces the additive interference in which the desired symbols are embedded in. Therefore, the interference level should reduce monotonically as one goes down in processing order. In a noisy environment, however, any incorrect decision made on a symbol in an iteration leaves its contribution in the updated received signal available for processing in the following iterations. Fortunately, if the level of interference is estimated and the soft bits are scaled appropriately by the estimated interference power, the performance of IMMSE receiver can be greatly improved. Preferred embodiments estimate the interference by computing the probability of error in decoding the symbols of the previous stage(s). The computation of decision error probability depends on the constellation size of transmitted symbols and introduces very little processing overhead.

20 Claims, 5 Drawing Sheets

MIMO DECODING

CROSS-REFERENCE TO RELATED APPLICATIONS

The following applications disclose related subject matter and have a common assignee with the present application: application Ser. No. 10/765,009, filed Jan. 26, 2004, now U.S. Pat. No. 7,321,564.

BACKGROUND OF THE INVENTION

The present invention relates to communication systems, and more particularly to multiple-input multiple-output wireless systems.

Wireless communication systems typically use band-limited channels with time-varying (unknown) distortion and may have multi-users (such as multiple clients in a wireless LAN). This leads to intersymbol interference and multi-user interference, and requires interference-resistant detection for systems which are interference limited. Interference-limited systems include multi-antenna systems with multi-stream or space-time coding which have spatial interference, multi-tone systems, TDMA systems having frequency selective channels with long impulse responses leading to intersymbol interference, CDMA systems with multi-user interference arising from loss of orthogonality of spreading codes, high data rate CDMA which in addition to multi-user interference also has intersymbol interference.

Interference-resistant detectors commonly invoke one of three types of equalization to combat the interference: maximum likelihood sequence estimation, (adaptive) linear filtering, and decision-feedback equalization. However, maximum likelihood sequence estimation has problems including impractically large computation complexity for systems with multiple transmit antennas and multiple receive antennas. Linear filtering equalization, such as linear zero-forcing and linear minimum square error equalization, has low computational complexity but has relatively poor performance due to excessive noise enhancement. The decision-feedback (iterative) detectors, such as iterative zero-forcing and iterative minimum mean square error, have moderate computational complexity and exhibits superior performance compared to linear receivers.

In an iterative receiver, the symbols from a transmit antenna are first detected. The contribution due to these symbols in the received signal is then removed, followed by detection of symbols from the second transmit antenna. This procedure is followed until all transmitted symbols are detected. Since the soft symbols and soft bits are estimated in the presence of noise, they have to be scaled appropriately before being fed into the Viterbi decoder for the recovery of transmitted bits.

SUMMARY OF THE INVENTION

The present invention provides methods and detectors for multiple-input multiple-output (MIMO) systems with interference cancellation by a adjusting the scaling of soft estimates depending upon interference cancellation error probabilities.

This has shown advantages including improved performance for wireless systems.

DESCRIPTION OF THE PREFERRED EMBODIMENTS

1. Overview

Figure 1:
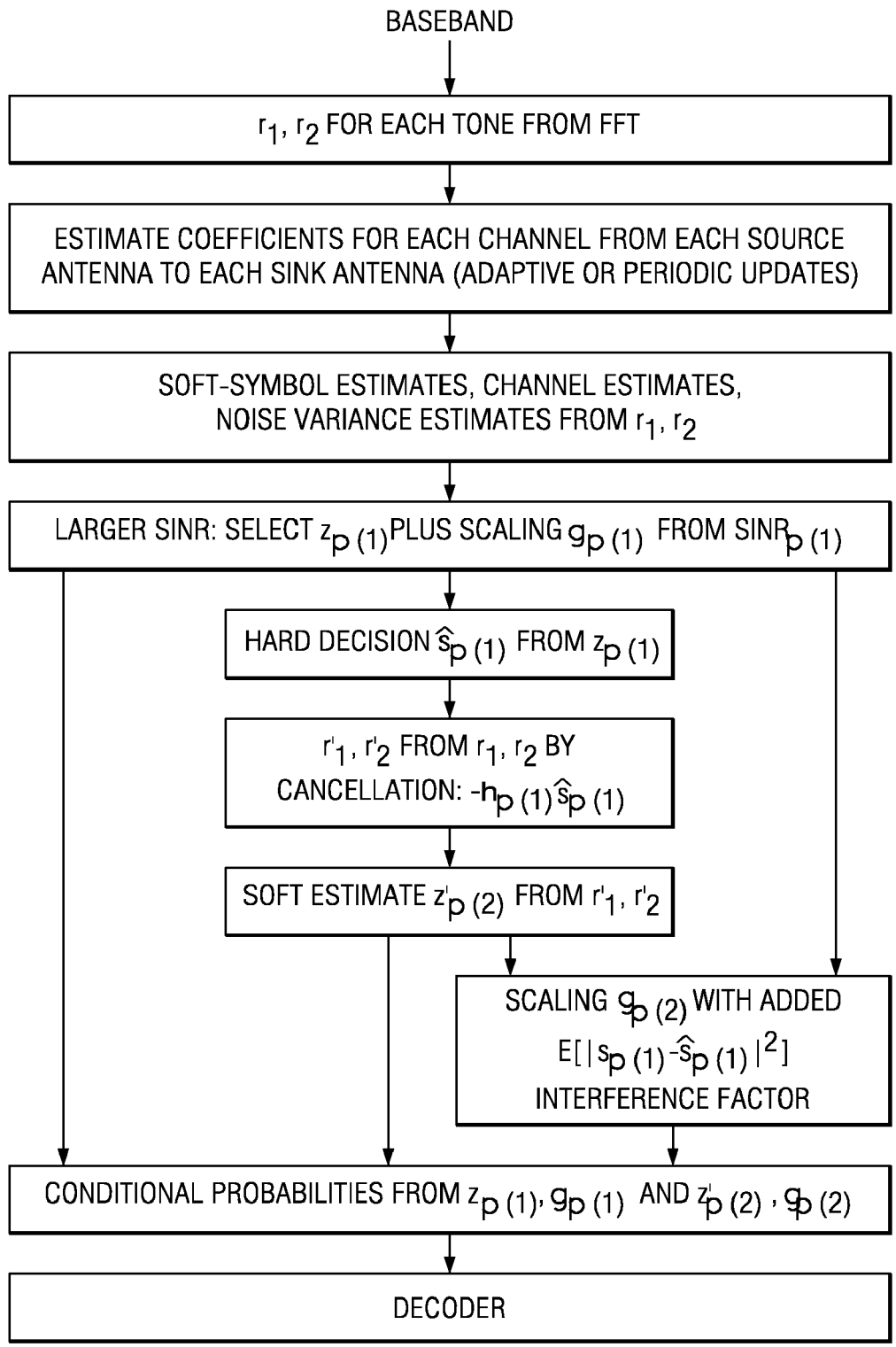
FIG. 1 is a flow diagram.

Preferred embodiment detectors and detection methods for multi-input, multi-output (MIMO) systems with interference cancellation capabilities compensate for decision errors in the symbols for cancellation by adjusting the scaling (normalization) of the transmitted soft symbol. The scaling factor has additive interference term proportional to a parameter depending upon the probability of decision errors. FIG. 1 is a flow diagram for a first preferred embodiment method with the additive interference term proportional to an estimate of the mean square decision error.

Preferred embodiment communication systems, such as wireless local area networks, include preferred embodiment interference cancellation receivers employing preferred embodiment interference cancellation methods. The computations can be performed with digital signal processors (DSPs) or general-purpose programmable processors or application specific circuitry (ASICs) or systems on a chip such as both a DSP, ASIC, and RISC processor on the same chip with the RISC processor in control. Analog-to-digital converters and digital-to-analog converters provide coupling to the real world, and modulators and demodulators (plus antennas for air interfaces) provide coupling for transmission waveforms.

2. Single Stage Iterative MMSE Detectors

Figure 2A:
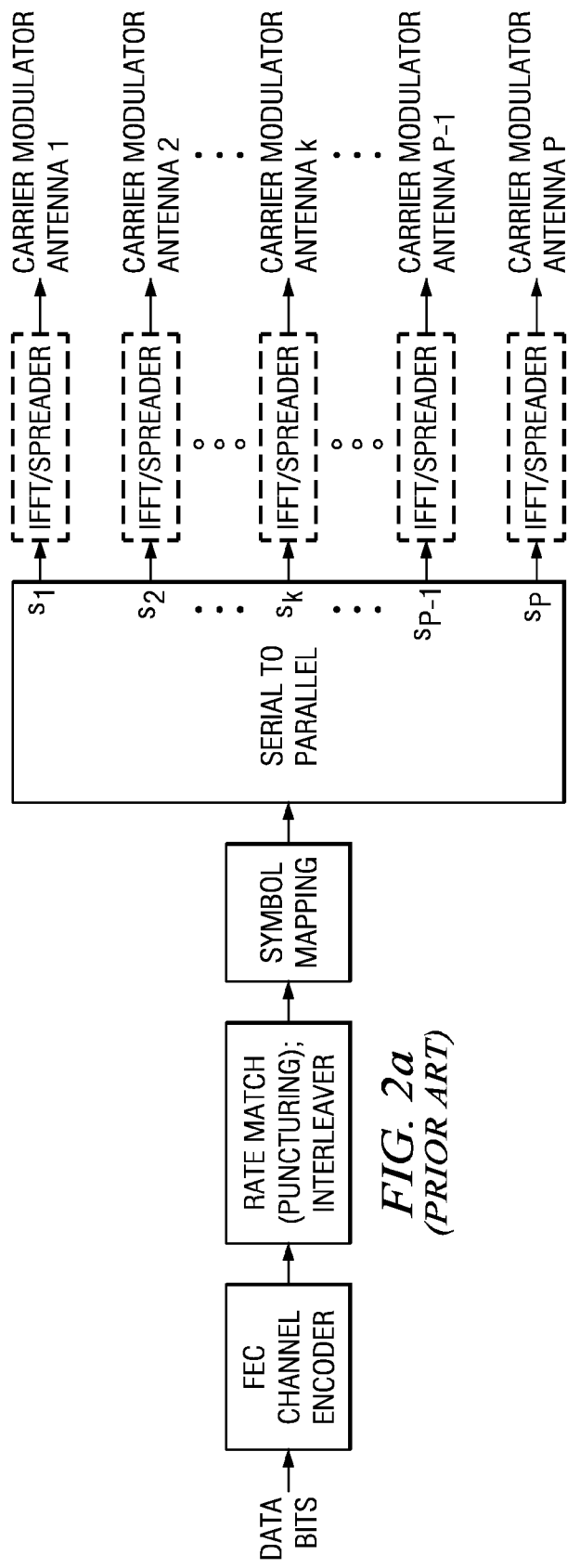
FIGS. 2a-2c illustrate functional blocks of detectors, receivers, and transmitters.
Figure 2B:
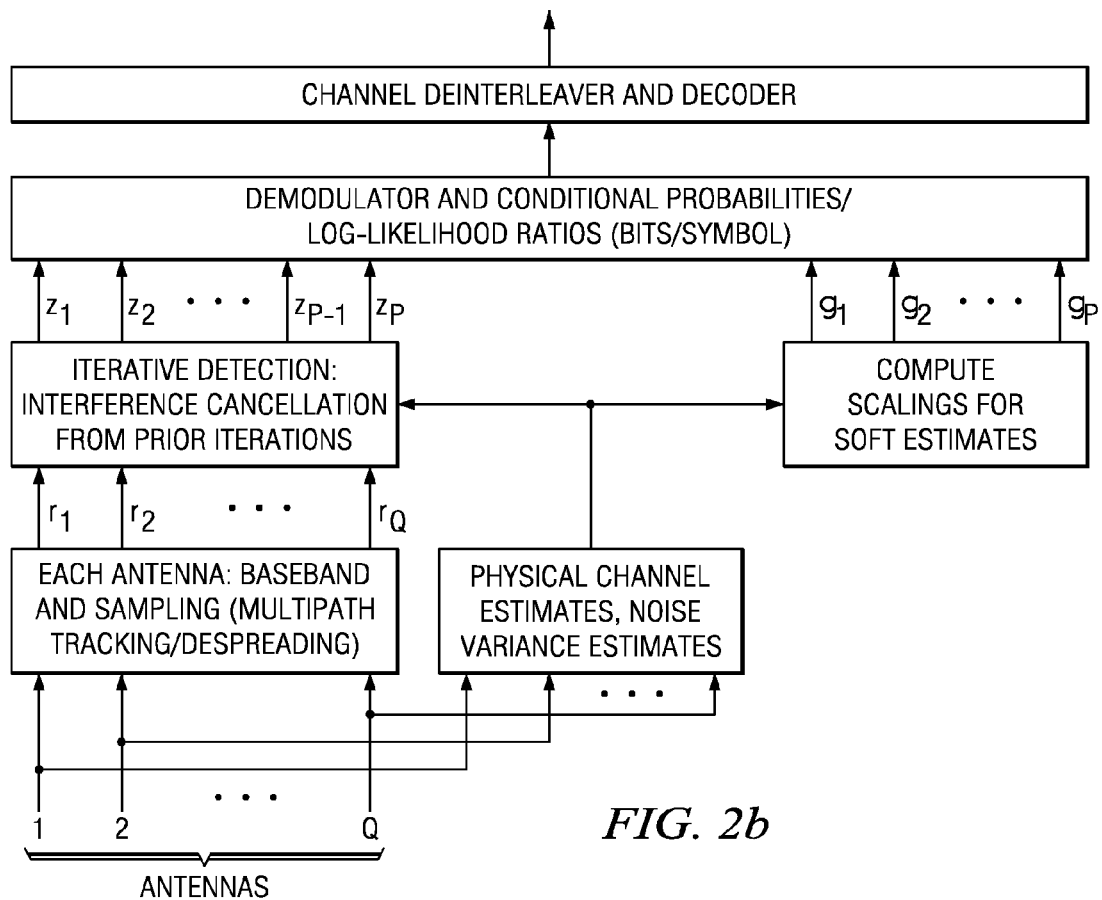

FIG. 2a illustrates a generic MIMO transmitter, and FIG. 2b illustrates a MIMO receiver with an interference-resistant detector; these could be part of a wireless communications system with P transmit antennas (P data streams) and Q receive antennas. The received signal in such a system can be written as:

$$r = Hs + w$$

where r is the Q-vector of samples of the received baseband signal (complex numbers) corresponding to a transmission time n:

$$r = \begin{bmatrix} r_1(n) \\ r_2(n) \\ \vdots \\ r_Q(n) \end{bmatrix};$$

s is the P-vector of transmitted symbols (sets of complex numbers of a symbol constellation) for time n:

$$s = \begin{bmatrix} s_1(n) \\ s_2(n) \\ \vdots \\ s_P(n) \end{bmatrix};$$

H is the Q×P channel matrix of attenuations and phase shifts; and w is a Q-vector of samples of received (white) noise. That is, the (q,p)th element of H is the channel (including multipath combining and equalization) from the pth transmit source to the qth receive sink, and the qth element of w is the noise seen at the qth receive sink.

Note that the foregoing relation applies generally to various systems with various interference problems and in which n, r, s, P, and Q have corresponding interpretations. For example:
(i) High data rate a multi-antenna systems such as BLAST (Bell Labs layered space time architecture) or MIMO and multi-stream space-time coding: spatial interference suppression techniques are used in detection.
(ii) Broadband wireless systems employing OFDM (orthogonal frequency division multiplex) signaling and MIMO techniques for each tone or across tones.
(iii) TDMA (time division multiple access) systems having frequency-selective channels with long impulse response which causes severe ISI (intersymbol interference). Use equalizers to mitigate ISI.
(iv) CDMA (code division multiple access) systems having frequency-selective channels which cause MUI (multi-user interference) as a result of the loss of orthogonality between spreading codes. For high data rate CDMA systems such as HSDPA and 1×EV-DV, this problem is more severe due to the presence of ISI. Equalizers and/or interference cancellation may be used to mitigate these impairments.
(v) Combinations of foregoing.

P is essentially the number of symbols that are jointly detected as they interfere with one another, and Q is simply the number of collected samples at the receiver. Because there are P independent sources, Q must be at least be as large as P to separate the P symbols. A detector in a receiver as in FIGS. 2a-2b outputs soft estimates z of the transmitted symbols s to a demodulator and decoder.

Presume that different symbols that are transmitted via P different antennas are uncorrelated and may also utilize different modulation schemes. This implies the P×P matrix of expected symbol correlations, $\Lambda=E[ss^H]$, is diagonal with entries equal the expected symbol energies ($\lambda_k = E[|s_k|^2]$); i.e., $$\Lambda = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_P \end{bmatrix}$$

For linear filtering equalization detectors, such as linear zero-forcing (LZF) or linear minimum mean square error (LMMSE), the soft estimates, denoted by P-vector z, derive from the received signal by linear filtering with P×Q matrix F; namely, z=F r. LZF detection essentially takes F to be the pseudoinverse of H; namely, $F=[H^H H]^{-1} H^H$.

In contrast, LMMSE detection finds the matrix F by minimizing the mean square error, $E[\|z-s\|^2]$. With perfect estimation of the channel H, the minimizing matrix F is given by:

$$F = [H^H H + \sigma^2 \Lambda^{-1}]^{-1} H^H = \Lambda H^H [H \Lambda H^H + \sigma^2 I_Q]^{-1}$$

where $\sigma^2$ is the variance per symbol of the additive white noise w and $I_Q$ is the Q×Q identity matrix. Note F has the form of a product of an equalization matrix with $H^H$ which is the matrix of the matched filter for the channel. Also, note that this LMMSE detector is biased; however, the normalization (scaling) can correct this as described below and indicated in FIG. 2b.

A one-stage iterative (decision-feedback) detector for blocks of P symbols has a series of P linear detectors (P iterations) with each linear detector followed by a (hard) decision device and interference subtraction (cancellation). Each of the P linear detectors (iterations) generates both a hard and a soft estimate for one of the P symbols. The hard estimate is used to regenerate the interference arising from the already-estimated symbols which is then subtracted from the received signal, and the difference used for the next linear symbol estimation. This presumes error-free decision feedback. More explicitly, let s denote the P-vector of transmitted symbols to be estimated, $\hat{s}^{(i)}$ denote the ith iteration output P-vector of hard symbol estimates (first i components equal to the hard estimates $\hat{s}_1, \hat{s}_2, \ldots, \hat{s}_i$ of the first i symbols, $s_1, s_2, \ldots, s_i$, and the remaining P-i components each equal to 0), and $z^{(i)}$ denote the ith iteration output P-vector of soft estimates of $s_1-\hat{s}_1, s_2-\hat{s}_2, \ldots, s_{i-1}-\hat{s}_{i-1}, s_i, s_{i+1}, \ldots, s_P$. That is, estimates of the transmitted symbols with the already-estimated first i−1 symbols subtracted out. The hard decision for the ith symbol, $\hat{s}_i$, arises from application of a hard decision operator on the soft estimate: $\hat{s}_i = D\{z_i^{(i)}\}$. The ith iteration detection is:

$$z^{(i)} = F r - F H \hat{s}^{(i-1)}$$

where the second term is the soft estimation of the regenerated (propagated by H) hard decision symbol estimates of the prior i−1 iterations. For the first iteration there are no already-estimated symbols, so take $\hat{s}^{(0)} = 0_P$, a P-vector with each component equal to 0. Ideally, for the ith iteration the soft estimates $z_1^{(i)}, z_2^{(i)}, \ldots, z_{i-1}^{(i)}$ are just estimates of channel noise because the hard estimates would exactly cancel the transmitted symbols. Thus computational simplicity suggests omitting these computations by zeroing-out the corresponding rows (columns) of the matrices. More precisely, take:

$$z^{(i)} = F^{(i)} r - G^{(i)} \hat{s}^{(i-1)}$$

where $F^{(i)}$ and $G^{(i)}$ are the P×Q detection matrix and the P×P interference cancellation matrix for the ith iteration, respectively, and defined as:

$$F^{(i)} = \begin{bmatrix} 0_{(i-1) \times Q} \\ \Phi^{(i)} \end{bmatrix}$$

$$G^{(i)} = F^{(i)} \lfloor B_{i-1} \quad 0_{Q \times (P-i+1)} \rfloor$$

where the inversion matrix for IMMSE is $$\Phi^{(i)} = (A_i^H A_i + \sigma^2 \Lambda_i^{-1})^{-1} A_i^H$$

$$= \Lambda_i A_i^H (A_i \Lambda_i A_i^H + \sigma^2 I_Q)^{-1}$$

Figure 2C:
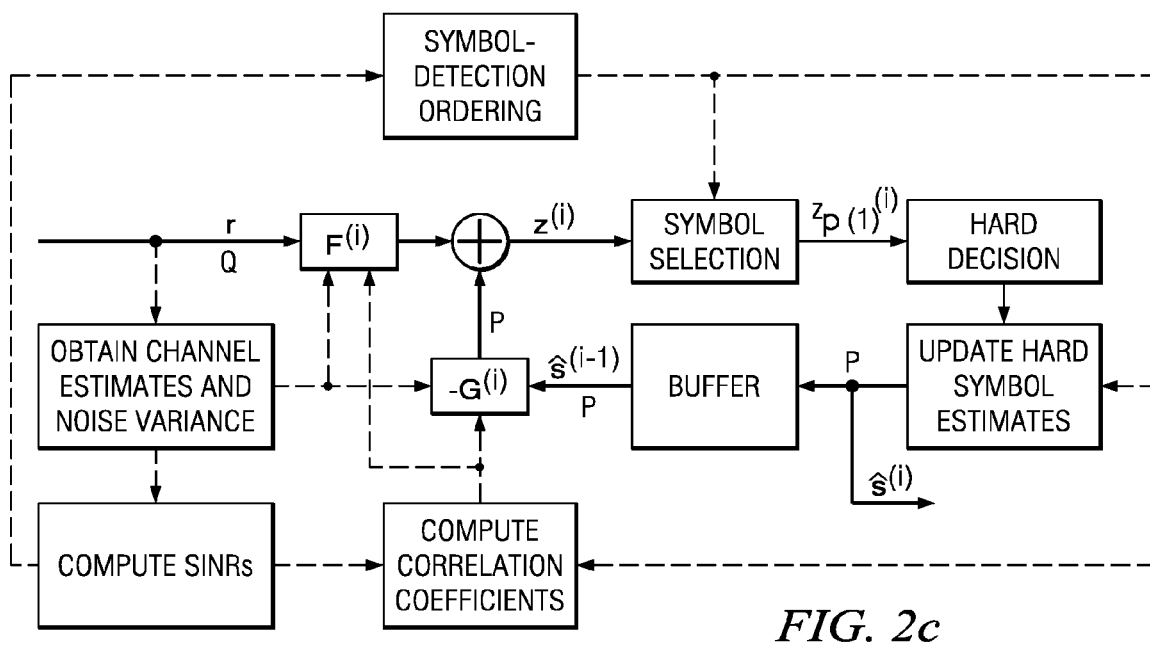

Here the last P−i+1 and first i−1 symbol portions of the channel matrix H are defined in terms of the P column vectors $h_1, h_2, \ldots, h_P$ of H as:

$$A_i = [h_i, h_{i+1}, \ldots, h_P]$$

a Q×(P−i+1) matrix, and $$B_i = [h_1, h_2, \ldots, h_{i-1}]$$

a Q×(i−1) matrix. Also, $0_{(i-1) \times Q}$ is the (i−1)×Q matrix of 0s, $0_{Q \times (P-i+1)}$ is the Q×(P−i+1) matrix of 0s, and $\Lambda_i$ is the lowerright (P−i+1)×(P−i+1) diagonal submatrix of Λ and thus the symbol energies of the symbols not-already estimated. FIG. 2c illustrates iterative detection.

Ordered detection based on the symbol post-detection signal-to-interference-plus-noise ratio (SINR) is often used to reduce the effect of decision feedback error. In particular, let the detection order be $\pi(1), \pi(2), \ldots, \pi(P)$ where $\pi( )$ is a permutation of the P integers $\{1, 2, \ldots, P\}$; that is, the first estimated symbol (hard estimate output) will be $\hat{s}_{\pi(1)}$ and thus also be the corresponding nonzero element of $\hat{s}^{(1)}$. The maximum SINR of the components of the first soft estimate $z^{(1)}$, which estimates all P symbols, determines $\pi(1)$. Similarly, the SINRs of the components of $z^{(2)}$, which estimates all of the symbols except the cancelled $s_{\pi(1)}$, determines $\pi(2)$, and so forth. That is, the ith iteration estimates symbol $s_{\pi(i)}$, and modifying the foregoing to accommodate the ordering is routine but omitted for clarity in notation. Indeed, simply denote the resulting P soft symbol estimates as $z_1, z_2, \ldots, z_P$. These MMSE detectors are biased estimators in the sense that $E[z_k|s_k]-s_k \neq 0$. However, the bias of the MMSE detectors can be removed by applying a scaling factor to the soft outputs. This scaling factor does not affect post-detection SINR, yet results in increased mean square error compared to the regular biased MMSE estimate. While this unbiasing operation does not affect the performance of LMMSE detectors, it improves the performance of IMMSE detectors because the decision device that is used to generate decision feedback assumes unbiased soft output. The unbiasing operation for IMMSE detectors rescales the soft estimates as follows:

$$\hat{z}_k = z_k / v_k$$

where $$v_k = \lambda_k h_k^H [A_k \Lambda_k A_k^H + \sigma^2 I_Q]^{-1} h_k$$
$$= ([A_k^H A_k + \sigma^2 \Lambda_k^{-1}]^{-1} A_k^H A_k)_{1,1}$$

with $\hat{z}_k$ denoting the soft output after unbiasing and the subscript 1,1 denoting the (1,1) matrix element. For unbiased IMMSE, variance-based and mean-squared-error-based normalizations are equivalent.

For a channel encoder (see FIG. 2a) using a convolution code, the demodulator (see FIG. 2b) converts the output P soft symbol estimates, $z_1, z_2, \ldots, z_P$, into (bit-level) conditional probabilities of the transmitted symbols, $s_1, s_2, \ldots, s_P$; and a decoder may translate (using a channel model) the conditional probabilities into branch metric values for trellis path searching. In particular, a maximum likelihood (Viterbi) decoder may use a branch metric derived from bit-level versions of $\log\{p(z|s)\}$, whereas a Fano algorithm sequential decoder may use a branch metric from bit-level versions of $\log\{p(z|s)/p(z)\}-K$ where K is the $\log_2$ of the number of possible inputs. For a channel encoder using a turbo code, the demodulator may provide log-likelihood ratios like $\log\{p(b=0|z)/p(b=1|z)\}$ to an iterative MAP decoder. Of course, a hard decision decoder just directly converts the soft symbol estimates into hard symbol estimates.

For example, an AWGN channel where the residual interference (interference which is not cancelled) is also a zero-mean, normally-distributed, independent random variable, gives:

$$p(z_k|s_k=c) \sim \exp(-|z_k-c|^2/\gamma_k)$$

where c is a symbol in the symbol constellation and $\gamma_k$ is a normalization (scaling) typically derived from the channel characteristics and the detector type. Of course, $\gamma_k$ is just twice the variance of the estimation error random variable.

For LZF type detectors the natural choice of $\gamma_p$ is the variance of the noise term associated with the soft estimate; that is, $\gamma_p=\text{var}(n_p)$ where $z_p=s_p+n_p$. This relates to the AWGN noise power of the channel ($\sigma^2$) and the corresponding (p,p) diagonal term of the matrix which amplifies the channel noise:

$$\gamma_p = \sigma^2 [H^H H]^{-1}_{p,p}$$

And for the iterative ZF detector (with numerical ordering) the analog applies:

$$\gamma_p = \sigma^2 [A_p^H A_p]^{-1}_{1,1}$$

where the (1,1) element corresponds to the channel from the pth symbol source due to the definition of $A_p$ with first column equal $h_p$.

For MMSE-type detectors a natural choice is to take $\gamma_p$ as the mean square error:

$$\gamma_p = E[|z_p - s_p|^2]$$

For LMMSE this translates to $$\gamma_p = \sigma^2 [H^H H + \sigma^2 \Lambda^{-1}]^{-1}_{p,p}$$

and for the unordered iterative MMSE the analog obtains:

$$\gamma_p = \sigma^2 [A_p^H A_p + \sigma^2 \Lambda_p^{-1}]^{-1}_{1,1}$$

MMSE-type detectors can also use a variance type normalization.

Because MMSE detectors are biased in the sense that the mean of the estimation error, $E[z_p-s_p]$, is not zero, the variance normalization becomes $$\gamma_p = E[|z_p-s_p|^2] - |E[z_p-s_p]|^2.$$

For linear MMSE this is $$\gamma_p = \sigma^2([H^H H + \sigma^2 \Lambda^{-1}]^{-1} H^H H [H^H H + \sigma^2 \Lambda^{-1}]^{-1})_{p,p}$$

and for unordered iterative MMSE this is:

$$\gamma_p = \sigma^2([A_p^H A_p + \sigma^2 \Lambda_p^{-1}]^{-1} A_p^H A_p [A_p^H A_p + \sigma^2 \Lambda_p^{-1}]^{-1})_{1,1}$$

The bias of the MMSE detectors can be removed as previously described, and for unbiased detectors the mean-square-error normalization and the variance normalization are thus equivalent.

An alternative normalization simply takes $$\gamma_p = \sigma^2/(\lambda_p \|h_p\|^2) \text{ for } p=1, 2, \ldots, P$$

where $\|h_p\|^2$ is the square of the norm of the channel Q-vector $h_p$, that is, the sum of the squared magnitudes of the Q components of the pth column of channel matrix H.

In more detail, in terms of the bits $b_{kj}$ which define the symbol $s_k$ in its constellation (e.g., two bits for a QPSK symbol, four bits for a 16QAM symbol, etc.), take as a practical approximation $p(z_k|b_{kj}=1) = p(z_k|s_k=c_{kj=1})$ where $c_{kj=1}$ is the symbol in the sub-constellation of symbols with jth bit equal 1 and which is the closest to $z_k$; that is, $c_{kj=1}$ minimizes $|z_k-c_{j=1}|^2$ for $c_{j=1}$ a symbol in the sub-constellation with jth bit equal to 1. Analogously for $p(z_k|b_{kj}=0)$ using the sub-constellation of symbols with jth bit equal 0.

Similarly, the decoder for a binary trellis may use log likelihood ratios (LLRs) which are defined as $$LLR(b_{kj}) = \log\{p[b_{kj}=1\mid z_k]/p[b_{kj}=0\mid z_k]\}$$
$$= \log\{p[b_{kj}=1\mid z_k]\} - \log\{p[b_{kj}=0\mid z_k]\}$$
$$= \log\{p(z_k\mid b_{kj}=1)/p(z_k\mid b_{kj}=0)\} +$$
$$\log\{p[b_{kj}=1]/p[b_{kj}=0]\}$$

where the first log term includes the probability distribution of the demodulated symbol $z_k$ which can be computed using the channel model. The second log term is the log of the ratio of a priori probabilities of the bit values and typically equals 0. Then again using the approximation $p(z_k|b_{kj}=1)=p(z_k|s_k=c_{kj=1})$ where $c_{kj=1}$ is the symbol in the sub-constellation of symbols with jth bit equal 1 and which is the closest to $z_k$ together with equal a priori probabilities yields:

$$LLR(b_{kj}) = \log\{p(z_k\mid b_{kj}=1)/p(z_k\mid b_{kj}=0)\}$$
$$\cong 1/\gamma_k\{\min_{j=0}|z_k - c_{j=0}|^2 - \min_{j=1}|z_k - c_{j=1}|^2\}$$

Thus the LLR computation just searches over the two symbol sub-constellations for the minima. The magnitude of LLR ($b_{kj}$) indicates the reliability of the hard decision $b_{kj}=0$ when $LLR(b_{kj})<0$ and $b_{kj}=1$ when $LLR(b_{kj})\geqq 0$.

The LLRs are used in decoders for error correcting codes such as Turbo codes (e.g., iterative interleaved MAP decoders with BCJR or SOVA algorithm using LLRs for each MAP) and convolutional codes (e.g. Viterbi decoders). Such decoders require soft bit statistics (in terms of LLR) from the detector to achieve their maximum performance (hard bit statistics with Hamming instead of Euclidean metrics can also be used but result in approximately 3 dB loss). Alternatively, direct symbol decoding with LLRs as the conditional probability minus the a priori probability could be used.

3. 2×2 OFDM System First Preferred Embodiment Scalings

Figure 3A:
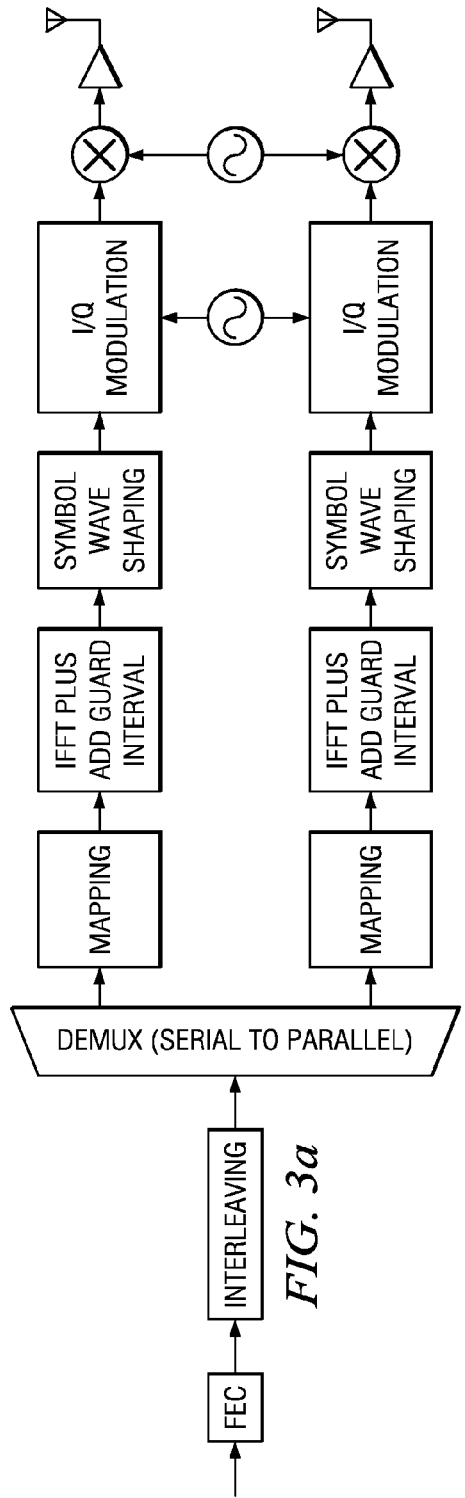
FIGS. 3a-3b show 2×2 MIMO OFDM transmitter and receiver.
Figure 3B:
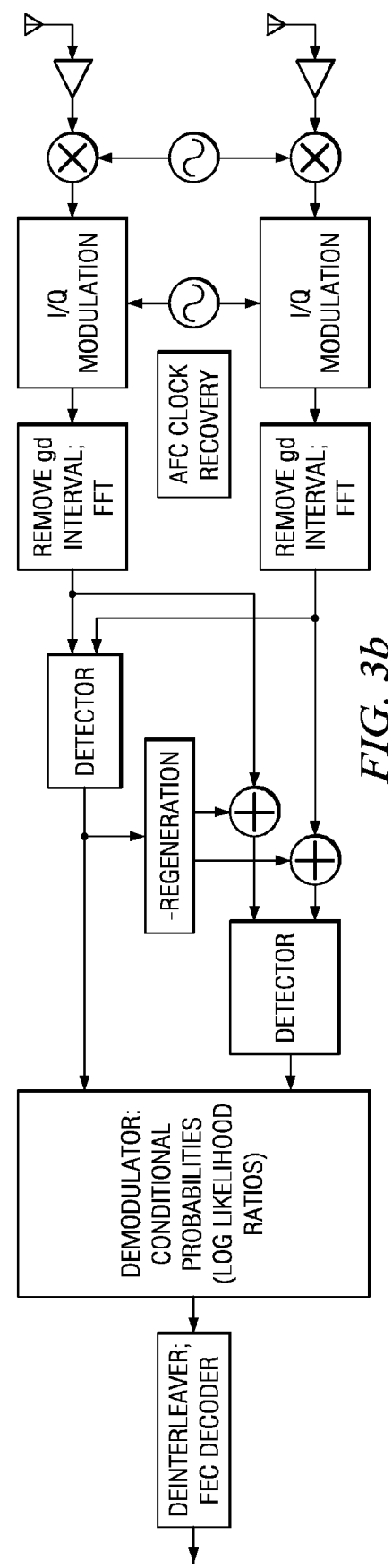

First preferred embodiment methods of compensation for interference-cancellation decision error apply generally to the foregoing MIMO systems, but the methods will be described in terms of an orthogonal frequency division multiplex (OFDM) system with a two-antenna transmitter and a two-antenna receiver as illustrated in FIGS. 3a-3b. Such a system could be part of a wireless LAN. In particular, the IEEE 802.11 standards include a 20 MHz channel (center frequency about 2.4 or 5 GHz) containing 64 equispaced distinct tones with a separation of 0.3125 MHz between adjacent tones, and each tone is modulated (e.g., BPSK, QPSK, 16 QAM, 64 QAM). An IFFT combines the modulated tones for transmission as illustrated in FIG. 3a; the symbol interval of 4 μs (microseconds) has 3.2 μs for the data signal and 0.8 μs of guard interval to lessen interference. 48 of the 64 tones are used as data tones, 4 are used as pilot tones, and 12 are unused; and the set of 48 complex numbers corresponding to the data tone modulations constitutes an OFDM symbol. The 4 pilot tones enable the system to track variations in phase and frequency over the duration of a data packet (e.g., 1000 symbols). The 12 unused tones limit interference with adjacent channels. The inverse discrete Fourier transform converts the 64 complex tone modulations into a 64-sample complex time-domain signal for transmission: each complex sample maps to in-phase and quadrature waveforms.

The forward error correction (FEC) coding may be a packet-based convolution code with a memory length of 7 (i.e., 64 states) such as the PBCC of the 802.11 standards. A packet preamble (direct sequence spread spectrum) of 96 μs allows time for estimation of channel parameters (sent to the decoder) during synchronization and training. The FFT of the receiver separates the tones, and each tone has a corresponding set of channel parameters (i.e., $h_{11}(k)$, $h_{12}(k)$, $h_{21}(k)$, and $h_{22}(k)$). That is, for the kth tone the received baseband signals from antennas 1 and 2 (with the time dependence omitted) $r_1(k)$ and $r_2(k)$, respectively, and are given by $$\begin{bmatrix} r_1(k) \\ r_2(k) \end{bmatrix} = \begin{bmatrix} h_{11}(k) & h_{21}(k) \\ h_{12}(k) & h_{22}(k) \end{bmatrix} \begin{bmatrix} s_1(k) \\ s_2(k) \end{bmatrix} + \begin{bmatrix} n_1(k) \\ n_2(k) \end{bmatrix}$$

where the kth tone symbol (e.g., point of the constellation) $s_1(k)$ was from transmitter antenna 1, symbol $s_2(k)$ from transmitter antenna 2, and with corresponding received noise $n_1(k)$ and $n_2(k)$. This can also be written in terms of 2-vectors as:

$$r(k)=h_1(k)s_1(k)+h_2(k)s_2(k)+n(k)$$

where $$h_j(k) = \begin{bmatrix} h_{j1}(k) \\ h_{j2}(k) \end{bmatrix}$$

is the subchannel from the jth antenna to the two receiver antennas for the kth tone.

The detector generates soft estimates $z_1(k)$ and $z_2(k)$ for each tone (such as by LZF or LMMSE) and for each tone selects the symbol estimate with the larger SINR to be used for cancellation and re-estimation of the other symbol. In particular, consider LMMSE detection with the 2×2 detection matrix $F^{(1)}$ of section 2 and, after unbiasing, express the detection as weights $W_{j,k}^*$:

$$\begin{bmatrix} z_1(k) \\ z_2(k) \end{bmatrix} = \begin{bmatrix} w_{1,1}(k)^* & w_{1,2}(k)^* \\ w_{2,1}(k)^* & w_{2,2}(k)^* \end{bmatrix} \begin{bmatrix} r_1(k) \\ r_2(k) \end{bmatrix}$$

The weights are given by:

$$w_1(k)=\{[\Sigma+h_2(k)h_2(k)^H]^{-1}h_1(k)\}/\{h_1(k)^H[\Sigma+h_2(k)h_2(k)^H]^{-1}h_1(k)\}$$

$$w_2(k)=\{[\Sigma+h_1(k)h_1(k)^H]^{-1}h_2(k)\}/\{h_2(k)^H[\Sigma+h_1(k)h_1(k)^H]^{-1}h_2(k)\}$$

where $$w_j(k) = \begin{bmatrix} w_{j,1} \\ w_{j,2} \end{bmatrix} \text{ and } \sum = \begin{bmatrix} \sigma_1^2(k) & 0 \\ 0 & \sigma_2^2(k) \end{bmatrix},$$

the covariance of the AWGN noise $$\begin{bmatrix} n_1(k) \\ n_2(k) \end{bmatrix}.$$

Note that the $w_j(k)$ satisfy $h_j(k)^H w_j(k)=1$ and correspond to the rows of detection matrix $F^{(1)}$ of section 2. The corresponding SINRs are:

$$SINR_1(k)=h_1(k)^H[\Sigma+h_2(k)h_2(k)^H]^{-1}h_1(k)$$

$$SINR_2(k)=h_2(k)^H[\Sigma+h_1(k)h_1(k)^H]^{-1}h_2(k)$$

where $h_1(k)^H \ldots h_1(k)$ relates to the signal power, $\Sigma$ relates to the AWGN noise power, and $h_2(k) h_2(k)^H$ relates to the interference power in $SINR_1(k)$; $SINR_2(k)$ is analogous.

As illustrated in FIG. 3b, implement the iterative detection with interference cancellation by using a hard decision on the soft estimate with the larger SNR. Without loss of generality, take $z_1(k)=w_1(k)^H r(k)$ as having the larger SNR and let $\hat{s}_1(k)$ be the corresponding hard decision for $s_1(k)$. Then cancel the signal regenerated from $\hat{s}_1(k)$, and use this to re-estimate $s_2(k)$. That is, define:

$$r'(k)=r(k)-h_1(k)\hat{s}_1(k)$$

and determine $z'_2(k)$, a soft estimate for $s_2(k)$, from this interference-cancelled signal by $$z'_2(k)=w_3(k)^H r'(k)$$

where the weights $w_3(k)$ correspond to the interference cancelled signal in contrast to the weights $w_2(k)$ which estimate $s_2(k)$ from the signal including $s_1(k)$ interference. Thus the detector output to the demodulator for conditional probability computations would be $z_1(k)$ and $z'_2(k)$, together with the normalizations (scalings). And these soft estimates may be unbiased as previously noted. In particular, preliminarily consider the case of no error in $\hat{s}_1$. This is equivalent to just setting $h_1(k)=0$ in the foregoing expression for $w_2(k)$; namely, $$w_3(k)=\{\Sigma^{-1}h_2(k)\}/\{h_2(k)^H \Sigma^{-1} h_2(k)\}$$

The detector also supplies normalizations (scalings) $\gamma_1$ and $\gamma_2$ for $z_1(k)$ and $z'_2(k)$, respectively, to the demodulator for computation of the conditional probabilities (and branch metrics) for decoding. For $\gamma_1$ use the noise variance scaling (reciprocal of SINR) analogous to that of section 2 and cited above:

$$\gamma_1(k)=1/\{h_1(k)^H[\Sigma+h_2(k)h_2(k)^H]^{-1}h_1(k)\}$$

Note that this may also be expressed as $w_1(k)^H[\Sigma+h_2(k)h_2(k)^H]w_1(k)$.

For $\gamma_2(k)$ however, the preferred embodiments provide scalings which account for the possibility of error in the hard decision used in the interference cancellation. Indeed, the two symbol streams have been encoded with an error-correcting code (FEC in FIGS. 2a, 3a), and so the decoding may actually correct an erroneous hard decision $\hat{s}_1$ used in the interference cancellation.

As illustrated in FIG. 1, the first preferred embodiment detectors and methods compensate for this possibility of decision error in the interference cancellation by including a term proportional to the magnitude of detecting a symbol of the first stream as a symbol of the second stream (essentially the inner product of $h_1$ with $h_2$) as follows:

$$\gamma_2(k)=w_3(k)^H \Sigma w_3(k)+\alpha(k)|w_3(k)^H h_1(k)|^2$$

The first preferred embodiment methods take the proportionality parameter $\alpha(k)$ equal to $E[|s_1(k)-\hat{s}_1(k)|^2]$; so $\alpha$ explicitly depends upon the likelihood of a decision error. Note when $\alpha=0$ the scaling reduces to:

$$\gamma_2(k) = w_3(k)^H \sum w_3(k)$$

$$= 1/\left\{h_2(k)^H \sum^{-1} h_2(k)\right\}$$

$$= 1/\{|h_{21}(k)|^2/\sigma_1(k)^2 + |h_{22}(k)|^2/\sigma_2(k)^2\}$$

which just demonstrates that with no interference $1/\gamma_2$ is the sum of the SNRs of the two subchannels from transmitter antenna 2 to the two receiver antennas for the kth tone.

In general, $\alpha=E[|s_1-\hat{s}_1|^2]$ can be evaluated for AWGN channels. For example, presume a simple symbol constellation, BPSK, with two possible symbols: $-1$ and $+1$. In this case the two Gaussian exponents, $(z_1 \pm 1)^2/\gamma_1$, simplify to $\pm 2z_1/\gamma_1$ plus common terms which factor out and cancel. Thus the probability of a decision error from soft estimate $z_1$ becomes:

$$p(\hat{s}_1 \neq s_1 | z_1) = \exp(-|z_1|/\gamma_1)/\{\exp(-|z_1|/\gamma_1) + \exp(|z_1|/\gamma_1)\}$$

$$= [1-\tanh(|z_1|/\gamma_1)]/2$$

And so $\alpha=2^2 p(\hat{s}_1 \neq s_1|z_1)=2[1-\tan h(-|z_1|/\gamma_1)]$ because $|s_1-\hat{s}_1|=2$ when $\hat{s}_1 \neq s_1$ and equals 0 otherwise. Hence, for BPSK the scaling becomes:

$$\gamma_2(k) = w_3(k)^H \sum w_3(k) + 4p(\hat{s}_1 \neq s_1 | z_1)|w_3(k)^H h_1(k)|^2$$

$$= w_3(k)^H \sum w_3(k) + 2[1-\tanh(|z_1|/\gamma_1)]|w_3(k)^H h_1(k)|^2$$

For other symbol constellations the computations are more involved.

Further, the first preferred embodiments allow for overestimation of the probability of decision error by inserting a positive weighting factor $\lambda$ into the tan h and thereby use $$p(\hat{s}_1 \neq s_1|z_1)=[1-\tan h(\lambda|z_1|\gamma_1)]/2$$

in $\gamma_2(k)$. A positive $\lambda$ less than 1 makes the tan h smaller and thus increases the probability estimate and consequent interference error compensation.

Figure 4:
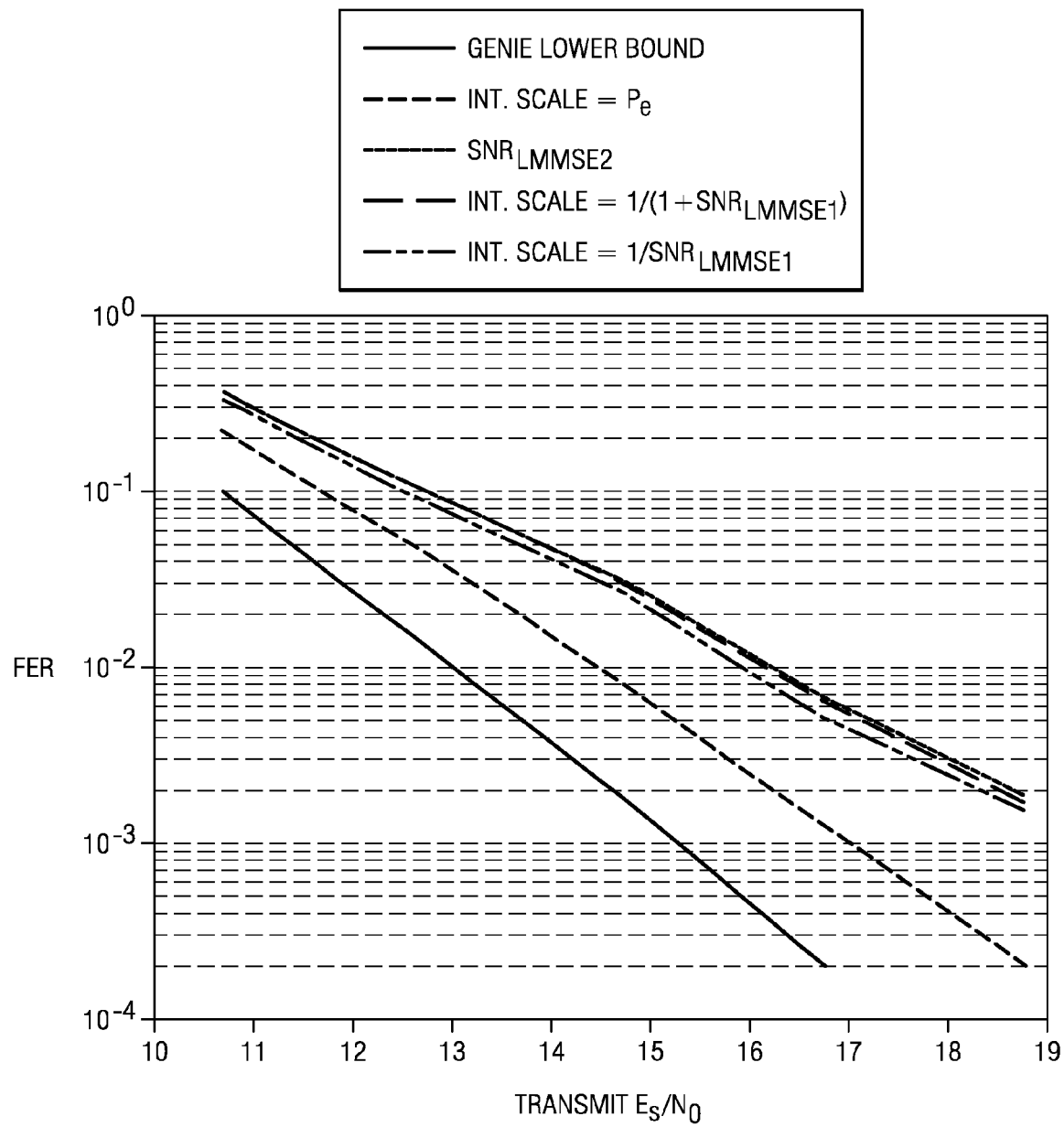
FIG. 4 illustrates simulation results.

FIG. 4 shows simulation results of frame error rate as a function of transmit SNR, $E_s/N_0$, for a coding rate of ¾, QPSK modulation, 200-byte packets, and three path Rayleigh fading. The figure includes this first preferred embodiment compensation method together with a lower bound on frame error rate which takes $\alpha(k)=0$ when there is no decision error and sets $\alpha(k)$ to the interference power when there is a decision error. FIG. 4 also shows the frame error rate for the second and third preferred embodiments described in the following section.

4. Further 2×2 Preferred Embodiment Scalings

Again consider an interference cancellation 2×2 OFDM system as in the foregoing section 3. Second and third preferred embodiment detectors and methods of compensation for decision error in the cancellation also apply to the parameter $\alpha(k)$ in the scaling for the second detected symbol:

$$\gamma_2(k)=w_3(k)^H \Sigma w_3(k)+\alpha(k)|w_3(k)^H h_1(k)|^2$$

The second preferred embodiments take $\alpha=1/(\beta+SINR_1(k))$ where $\beta$ is a positive constant. This $\alpha$ depends upon the likelihood of decision error in that as $SINR_1(k)$ increases the probability of decision error in $\hat{s}_1$ decreases; and this $\alpha$ can also account for the case where $SINR_2(k)$ approaches 0. In particular, the choice of $\beta=1$ is intuitively appealing as $1/(1+SINR)$ also is proportional to the probability of error in a Rayleigh fading environment. This choice of $\alpha$ has low computational complexity because $SINR_1(k)$ was already evaluated for the selection of which of the two symbols to estimate first and use to regenerate the cancellation signal.

A third preferred embodiment also uses $\alpha=1/(\beta+SINR)$ as in the second preferred embodiment but simplifies the computation by replacing the $SINR_1(k)$ with the decorrelator SINR given by $$SINR_1(k) = \frac{|h_1(k)|^2|h_2(k)|^2 - |h_1^H(k)h_2(k)|^2}{|h_2(k)|^2}$$

This replacement relies on the observation that for small AWGN (i.e., small $\sigma_j(k)$) the $SINR_1(k)$ is close to the decorrelator SINR. In such a case, with $\beta=1$, the scaling essentially is the inverse of $SINR_2(k)$:

$$\gamma_2(k)=1/\{h_2(k)^H[\Sigma+h_1(k)h_1(k)^H]^{-1}h_2(k)\}$$

FIG. 4 simulations compare the first preferred embodiment methods with the second and third preferred embodiment methods for $\beta=1$.

5. Modifications

For systems with more than two antennas and symbol streams, the cancellation error compensation methods may be extended and even mixed. For example, if $z_1(k)$, $z_2(k)$, and $z_3(k)$ are detected in this order, then symbol $\hat{s}_1(k)$ is detected in the first iteration. The received signal due to $\hat{s}_1(k)$ is then regenerated and subtracted from r(k) to give r'(k) and $z'_2(k)$ (and $z'_3(k)$) are detected from r'(k) together with scaling for $z'_2(k)$ which incorporates an $\hat{s}_1(k)$ error statistic. Then obtain $\hat{s}_2(k)$ from $z'_2(k)$; this constitutes the second iteration. Finally, the contribution due to both $\hat{s}_1(k)$ and $\hat{s}_2(k)$ is taken out from the received signal to have r"(k) and $z"_3(k)$ is detected from this together with a scaling which incorporates an $\hat{s}_1(k)$ error and/or an $\hat{s}_2(k)$ error statistic. The $\hat{s}_1(k)$ error and/or $\hat{s}_2(k)$ error statistic could differ from the $\hat{s}_1(k)$ error statistic used with the scaling for $z'_2(k)$.

What is claimed is:

1. A method of detecting in a receiver, comprising:
(a) receiving a Q-vector signal by the receiver representing a set of P symbols where P and Q are both integers greater than 1;
(b) estimating a first symbol of said set of P symbols;
(c) subtracting an estimate of the portion of said received signal due to said first symbol estimate from step (b) to give a first interference-cancelled received signal;
(d) soft-estimating a second symbol of said set of P symbols from said first interference-cancelled received signal; and
e) providing a scaling for said soft-estimated second symbol from step (d) as a combination of (i) a detection scaling for said second symbol using said first interference-cancelled received signal and (ii) a first symbol estimate error term wherein said first symbol estimate error term includes a statistic relating to error in said first symbol estimate.

2. The method of claim 1, wherein:
(a) each of said P symbol is a vector of components with each component an element of a constellation where the number of components is greater than 1.

3. The method of claim 2, wherein:
(a) P=Q=2; and
(b) said components of each of said symbols correspond to tones of an orthogonal frequency division multiplex system with K tones where K is an integer greater than 1.

4. The method of claim 1, further comprising:
(a) estimating said second symbol of said set of P symbols;
(b) subtracting an estimate of the portion of said first interference-cancelled received signal due to said second symbol estimate from step (a) to give a second interference-cancelled received signal;
(c) soft-estimating a third symbol of said set of P symbols from said second interference-cancelled received signal; and
(d) providing a scaling for said soft-estimated third symbol from step (c) as a combination of (i) a detection scaling for said third symbol using said second interference-cancelled received signal and (ii) a first symbol estimate error and/or second symbol estimate error term wherein said first symbol estimate error and/or second symbol estimate error term includes a statistic relating to error in said first symbol estimate and/or said second symbol estimate.

5. The method of claim 1, wherein:
(a) said first symbol error term is $\alpha|w^H h_1|^2$ where w is a Q-vector of detection weights for soft-estimating said second symbol from said first interference-cancelled received signal, $h_1 s_1$ is an estimate of the portion of said received signal due to said first symbol estimate when $S_1$ is said first symbol estimate, $h_1$ is a channel effect for $s_1$, and $\alpha$ relates to error in said first symbol estimate.

6. The method of claim 5, wherein:
(a) $\alpha$ equals the expectation of $|s_1-\hat{s}_1|^2$ where $s_1$ is said first symbol and $\hat{s}_1$ is said first symbol estimate.

7. The method of claim 5, wherein:
(a) $\alpha$ equals $1/(\beta+SINR_1)$ where $\beta$ is a positive number and $SINR_1$) is the estimated signal to interference plus noise ratio of said first symbol.

8. The method of claim 5, wherein:
(a) $\alpha$ equals $1/(\beta+SINR_1)$ where $\beta$ is a positive number and $SINR_1$ is the estimated decorrelator signal to interference plus noise ratio.

9. The method of claim 1, wherein:
(a) said soft-estimated second symbol from step (d) of claim 1 is minimum mean squared error estimation.

10. The method of claim 1, wherein:
(a) said soft-estimated second symbol from step (d) of claim 1 is zero-forcing estimation.

11. An iterative detector for a receiver, comprising:
(a) a first detector for estimating a first symbol from a received Q-vector signal by the receiver representing a set of P symbols where P and Q are both integers greater than 1;
(b) a regenerator-subtracter coupled to said first detector and for (i) regenerating an estimate of the portion of said received signal due to a first symbol estimate from said first detector and (ii) subtracting this regenerated estimate from said received signal to give a first interference-cancelled received signal;
(c) a second detector coupled to said regenerator-subtractor and for soft-estimating a second symbol of said set of P symbols from said first interference-cancelled received signal; and (d) a scaling circuit coupled to said second detector and for scaling a soft-estimated second symbol from said second detector, wherein said scaling circuit combines (i) a detection scaling for said second detector and (ii) a first symbol estimate error term wherein said first symbol estimate error term includes a statistic relating to error in said first symbol estimate.

12. The detector of claim 11, wherein:
(a) said first detector, said regenerator-subtractor, said second detector, and said scaling circuit are implemented as a programmable processor plus program memory plus peripheral circuitry.

13. The detector of claim 11, wherein:
(a) said first detector outputs a soft estimate of said first symbol to said scaling circuit; and
(b) said scaling circuit outputs soft estimates and scalings for both said first symbol and said second symbol to a decoder.

14. The detector of claim 11, wherein:
(a) P=Q=2; and
(b) said components of each of said symbols correspond to tones of an orthogonal frequency division multiplex system with K tones.

15. The detector of claim 14, further comprising:
(a) a discrete Fourier transform circuit coupled to said first detector and said regenerator-subtractor, said discrete Fourier transform circuit for K-point Fourier transforms.

16. The detector of claim 11, wherein:
(a) said first symbol error term of said scaling circuit is $\alpha |w^H h_1|^2$ where w is a Q-vector of detection weights for soft-estimating said second symbol from said first interference-cancelled received signal, $h_1 s_1$ is an estimate of the portion of said received signal due to said first symbol estimate when $s_1$ is said first symbol estimate, $h_1$ is a channel effect $s_1$, and $\alpha$ relates to error in said first symbol estimate.

17. The detector of claim 16, wherein:
(a) $\alpha$ equals the expectation of $|s_1 - \hat{s}_1|^2$ where $s_1$ is said first symbol and $\hat{s}_1$ is said first symbol estimate.

18. The detector of claim 16, wherein:
(a) $\alpha$ equals $1/(\beta + SINR_1)$ where $\beta$ is a positive number and $SINR_1$ is the estimated signal to interference plus noise ratio of said first symbol.

19. The detector of claim 16, wherein:
(a) $\alpha$ equals $1/(\beta + SINR_1)$ where $\beta$ is a positive number and $SINR_1$ is the estimated decorrelator signal to interference plus noise ratio.

20. The detector of claim 11, wherein:
(a) said soft-estimated second symbol of said second detector is a minimum mean squared error estimator.

* * * * *